(12) United States Patent
Grande et al.

(10) Patent No.: US 10,566,882 B2
(45) Date of Patent: Feb. 18, 2020

(54) SYSTEM AND METHOD FOR A MITIGATING HIGH FREQUENCY COMMON MODE (L-G) PHENOMENA AND ASSOCIATED AFFECTS ON ELECTRICAL SUBMERSIBLE PUMPS MECHANICAL RUN LIFE

(71) Applicant: MAGNEY GRANDE DISTRIBUTION INC., Bayfield, CO (US)

(72) Inventors: Salvatore F. Grande, Bayfield, CO (US); David D. Shipp, Murrysville, PA (US)

(73) Assignee: Magney Grande Distribution, Inc., Bayfield, CO (US)

( * ) Notice: Subject to any disclaimer, the term of this patent is extended or adjusted under 35 U.S.C. 154(b) by 0 days.

(21) Appl. No.: 15/793,099

(22) Filed: Oct. 25, 2017

(65) Prior Publication Data
US 2019/0044421 A1    Feb. 7, 2019

Related U.S. Application Data

(60) Provisional application No. 62/522,102, filed on Jun. 20, 2017, provisional application No. 62/412,804, filed on Oct. 25, 2016.

(51) Int. Cl.
| | |
|---|---|
| *H02P 27/04* | (2016.01) |
| *H02K 11/40* | (2016.01) |
| *H02K 5/16* | (2006.01) |
| *F04B 49/06* | (2006.01) |
| *H02P 7/29* | (2016.01) |

(52) U.S. Cl.
CPC .............. *H02K 11/40* (2016.01); *F04B 49/06* (2013.01); *H02K 5/16* (2013.01); *F04B 2203/0202* (2013.01); *F04B 2203/0211* (2013.01); *F04B 2203/0213* (2013.01); *H02P 27/04* (2013.01)

(58) Field of Classification Search
USPC ......................................................... 318/599
See application file for complete search history.

(56) References Cited

U.S. PATENT DOCUMENTS

| | | | |
|---|---|---|---|
| 2013/0175030 A1* | 7/2013 | Ige .......................... | E21B 43/128 166/250.15 |
| 2013/0278183 A1* | 10/2013 | Liang ................... | G06F 17/5036 318/400.2 |
| 2016/0006481 A1* | 1/2016 | Rendusara ................ | F04D 1/06 340/854.9 |
| 2017/0146015 A1* | 5/2017 | Hawes ................ | F04D 15/0066 |

* cited by examiner

*Primary Examiner* — Bentsu Ro
(74) *Attorney, Agent, or Firm* — G. Michael Roebuck, PC

(57) ABSTRACT

A common mode line-to-ground filter is disclosed which includes but is not limited to a resistor, capacitor and a ground. The common mode line to ground filter is connected on a high side of a step-up transformer. A low side of the step-up transformer is connected to a variable frequency drive that provides a semi-sinusoidal voltage waveform. The common mode line to ground filter generates a filtered sinusoidal waveform from the output of the step-up transformer. The filtered sinusoidal voltage waveform is supplied via an electrical cable to an electrically submersible pump deployed downhole.

13 Claims, 16 Drawing Sheets

SYSTEM AND METHOD FOR A MITIGATING HIGH FREQUENCY COMMON MODE (L-G) PHENOMENA AND ASSOCIATED AFFECTS ON ELECTRICAL SUBMERSIBLE PUMPS MECHANICAL RUN LIFE

BACKGROUND OF THE INVENTION

Electrical submersible pumps (ESP) fail operated variable frequency drives (VFDs) have a reduced run life as opposed to operation on a direct switch board on cause cessation of production operations necessary to retrieve, remove and replace a failed ESP. The switch board is also referred to in the industry as an "across the line starter". The industry average of run life for an ESP is over 4 years, whereas the operation of an ESP on a VFD is less than 2 years.

FIELD OF THE INVENTION

The field of the invention is electrical filters for oil field electrical equipment operating on VFDs.

SUMMARY OF THE INVENTION

A common mode line-to-ground filter is disclosed which includes but is not limited to a resistor, capacitor and a ground. The common mode line to ground filter is connected to an electrical power supply that provides a semi-sinusoidal voltage waveform. The common mode line to ground filter substantially reduces the high voltage high frequency current that travels downhole over an electrical cable to the ESP equipment. The high voltage high frequency current is shunted to ground the common mode filter at the surface. The ESP and associated down hole mechanical and electrical equipment and components are less stressed by this reduction of the high voltage high frequency current, allowing for increased runtimes and decreased failures.

DETAILED DESCRIPTION OF THE INVENTION

Figure 1:
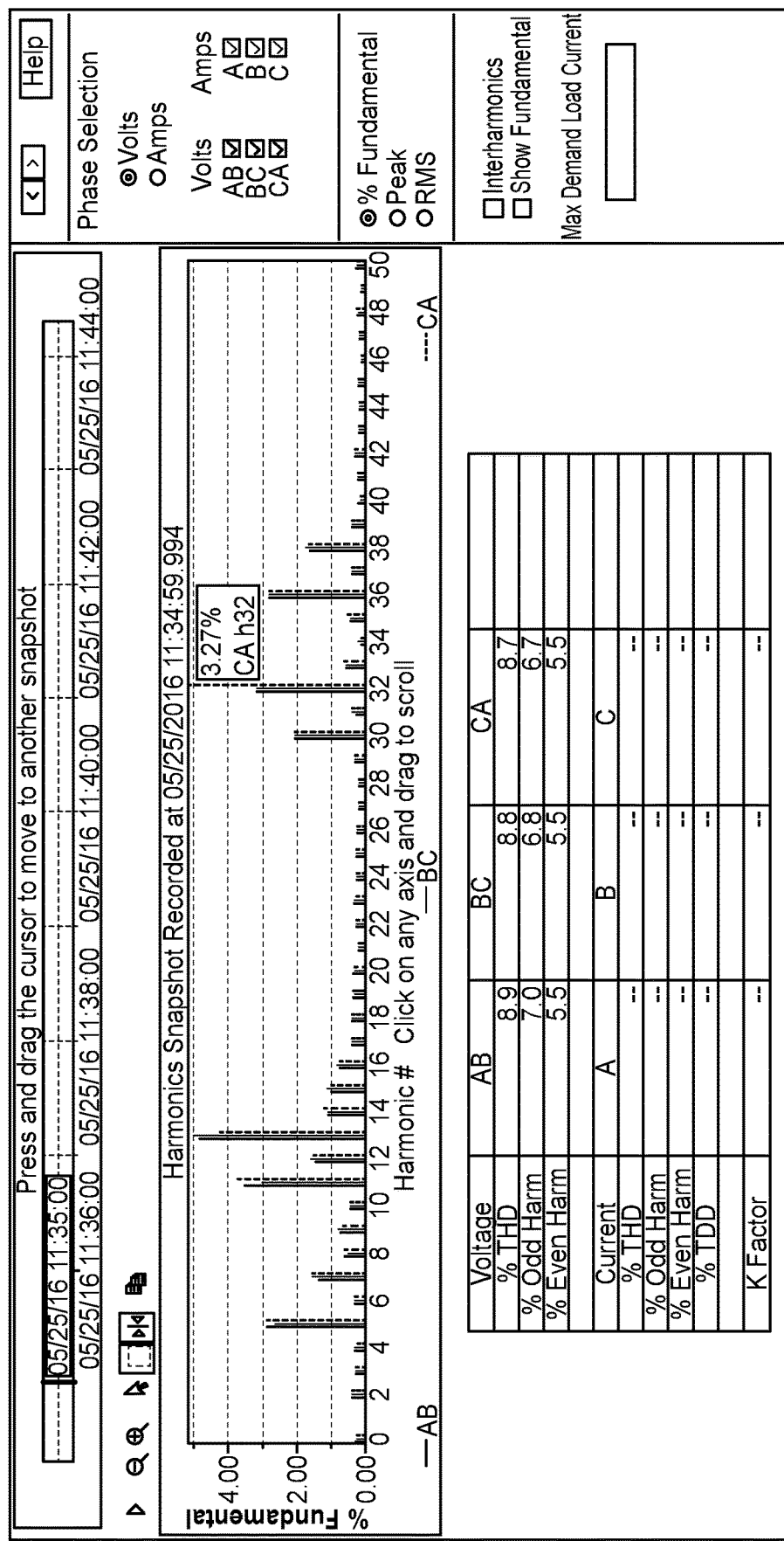
FIG. 1 is a side view of a graph depicting a frequency response for a HARMONIC VOLTAGE PROFILE-FPW vf-MV, NOCMF.

A system and method for Mitigating high frequency common mode (line to ground) phenomena and associated effects on electrical submersible pump (ESP) mechanical run life is disclosed.

The US Department of Energy (US DOE) provides very specific guidelines to reduce the damaging effects of these high frequency abnormalities on unfiltered PWM VFDs (e.g. using inverter duty sized motors, limiting the cable length to less than 15 feet and using bearing insulation). All these recommendations are very possible for surface systems, however can be immediately discounted for downhole ESP systems. A solution is presented herein for such applications is to mitigate those high frequency components and common mode currents on the surface using a CMF according to an illustrative embodiment of the invention. Several illustrative embodiments of the invention, Common Mode Filters (CMFs) are disclosed herein. The CMF is a field tested/proven, standalone component to extend overall ESP run times by reducing or eliminating high frequency induced mechanical failures.

High frequency noise on an ESP system operating with a VFD can cause a host of Power Quality (PQ) related anomalies, including nuisance tripping of a VFD, instantaneous overcurrent, zero crossing faults and erratic data transfer. High frequency currents cause skin effect heating and high frequency voltages cause reflection. The smallest and weakest links in the system are most susceptible to premature failures (e.g. penetrators, cable (where no mechanical damage is present), splices (not due to workmanship), MLE/Pothead, motor windings, and bearings).

The inventors have discovered that proper Root Cause Failure Analysis uncovers the truth about electrical submersible pump ESP system failures. A Common Mode Filter added as a standalone component to a system employing a sine wave filter substantially aids in the overall run life of the ESP. Knowledgeable resources are essential when conducting a failure analysis. The high frequency unfiltered common mode Line-to-Ground (L-G) noise and harmonics (high voltage high frequency voltage and current) associated with Pulse Width Modulation (PWM) Variable Speed Drive (VSD) operations can lead to electrical reflections causing electronic and mechanical damage in Electrical Submersible Pump (ESP) systems. The PWM filters that are applied today only filter the Normal Mode Line-to-Line (L-L) and 3-phase. Electrical anomalies can cause mechanical failures. Using VSDs for well operations will induce electrical stress in many ways such as, heat generated by harmonics (thermal failures), high frequency discharges through motor bearings (motor bearing fluting), harmonic induced torsional failure (shaft breaking) and with voltage reflection that impinges on the insulation system to cause premature cable, penetrator, splice, Motor Lead Extension (MLE)/pothead and winding insulation failures. This disclosure will present particular embodiments of the invention and some of the benefits of adding particular embodiments common mode filtering as a standalone component. By understanding the actual root cause of ESP failures, mechanical issues like rotor bearing failure and electrical failures can be attributed to not having common mode output filters on PWM VSDs. VFDs can significantly alleviate electricity costs, they can also dramatically reduce a motor's lifespan. Shaft voltages generated from the common-mode output of VSDs and VFDs lead to arcing across a motor bearing. If allowed to continue, arcing continues to damage the bearing and creates large grooves in the bearings, commonly referred to as "fluting". At this point, the motor bearing will need to be replaced.

The high frequency L-G PWM switching transient can even couple through Step-Up Transformers (SUT) and is reflected over long cable runs, resulting in voltage peaks that can be up to twice the surface transient voltage impulse at a reflection point (this can be more than 8000V peak at VSD carrier frequency intervals, typically 1800-2400 per second). This leads to pre-mature electrical and mechanical failures. Application of properly designed Sine Wave Filters (SWF) with L-G components will greatly reduce the transient magnitude of high voltage high frequency current and voltage and aid in the overall run life of the ESP.

The ESP industry has typically addressed the failures of ESP systems by increasing the physical properties or "beefing up" of the system (i.e. higher temperature, higher ampacity, better insulation, better bearings, etc.), however, such improvements just mask the issue and do not address the root cause of the failures. Beefing up of one link of one weak link in the ESP system will then call the next weakest link in the ESP system.

To insure an effective Root Cause Failure Analysis (RCFA) of ESP systems, it is important to collect as much data as possible prior to the equipment teardown and inspection. This includes, but is not limited to: equipment design data, operating conditions, fault data (controller information), equipment startup and installation logs, amp charts, operational history and pull reports. Other useful information would be test pump curves and acceptance, motor slant run test results, seal section or protector test reports. These reports are intrinsic to the equipment serial numbers.

Close review of the equipment will identify the failure modes of the ESP system. A thorough failure analysis may reveal failures in different components (i.e. cable, MLE, pump, penetrators, splices, protector, seal, motor, motor bearings and sensor). Seal section or protector encloses a sealed hot oil expansion bladder sacks. In order to identify the root cause, analysis of the total operating system is performed. For example, a motor may have a shorted stator and this failure can be caused by a number of events. The events may include voltage surges from the surface, cable damage and arcing, MLE failures, poor splicing, fluid entering from a seal failure, pothead failures and/or manufacturing defects, but may also include other deficiencies or complications that are only discovered during a thorough analysis. A "motor bum" in a failure report is not a proper RCFA.

Many anomalies occur in an ESP system and nuisance tripping of the VSDs may occur (e.g. instantaneous overcurrent, zero crossing faults, erratic data transfer, etc.). The approach to finding Power Quality (PQ) related issues is to evaluate the one-line electrical system, safety and equipment grounding, VSD operation and setup, review ESP Dismantle Inspection and Failure Analysis (DIFA) reports, and conduct electrical group and production engineering interviews. The inventors have performed many load side PQ studies that confirm that high frequency noise and high frequency voltage and current harmonics was present on a variety of ESP applications.

In the past 3 years the inventors have uncovered very unusual failures in ESP systems (motor rotors bearing fluting, penetrator, cable splice and pothead failures). These failures pointed the inventors in the direction of an unfiltered VSD common mode output, utilizing Pulse Width Modulation technology. In addition, VSDs that can operate either FPWM (sine wave filtered PWM) or ESP Mode (6-step), can generate similar symptoms and failures when operating in ESP Mode.

The worst VSD waveform for an ESP is unfiltered PWM. The best available is a good quality sine wave filter (SWF) on the output of a PWM drive (FPWM (Filtered PWM)). The high frequency content (both phase-to-phase and phase-to-ground) can cause down-hole failures in several ways. The most prevalent will be discussed.

High voltage impulses (high frequency) act like a mini lightning generator and send a continuous stream of "lightning-type impulses" down-hole to pound on the insulation likened to a jackhammer). This impulse is generated at the VFD PWM carrier frequency and its higher order harmonics. While each impulse is below the magnitude likely to cause failure by itself, the steady stream of impulses accelerates insulation degradation.

The laws of electricity with voltage source inverters (virtually all VSDs sourced for ESP applications) create voltage at the output inverter and allows whatever current at the individual frequencies, to flow to the load equipment.

The high frequency impulses will momentarily double at reflection points (penetrators, cable splices, MLE and motor coils); dramatically increasing voltage stress.

Unfiltered PWM wave forms (no SWF line-to-line) would insure the worst aspects of the high voltage high frequency impulses will substantially accelerate these types of failures rather quickly. This provides need for a SWF at the surface in an attempt to filter out the high voltage high frequency impulses. These SWF's are designed for L-L and 3 phase filtering only.

In August of 2016, additional testing was conducted on seven different Pulse Width Modulation (PWM) Variable Frequency Drive (VFD) topologies. These additional findings incorporate all ESP AC Induction Motor VFD topologies offered from every ESP vendor. These findings proved that high frequency high voltage and current common mode content was present on all VFD output waveforms tested.

Then additional field tests were performed to determine if the illustrative embodiment of the invention disclosed herein of the Common Mode Filters (CMF) applied at the MV taps of the SUT will be effective for all PWM VFD topologies. The field tests verified that the present design is effective and can be used for all PWM VFD topologies.

Sine Wave Filters (SWF) are mandatory for PWM drives. There was only one VFD output Normal Mode harmonic mitigation that was marginally acceptable. All others exhibited high frequency harmonics that affect ESP electrical and mechanical reliability. None of the existing drives had Common Mode Filtering.

A very significant finding, as data was collected, was that the wye grounded CMF at the MV level not only effectively lowered the L-G (Common Mode) and high frequency harmonic, but it ALSO decreased the overall L-L (Normal Mode) high frequency harmonic, which is already filtered with the manufacturer supplied SWF. By lowering both L-G and L-L high frequency harmonic, the ESP electrical and mechanical reliability will be increased and runtimes will improve.

In an illustrative embodiment of the invention, a SWF in combination with a CMF as disclosed herein in the illustrative embodiments of the invention will substantially reduce most of the high frequency phase-to-phase voltage, line-to-ground and 3 phase currents from making it down hole to the ESP electrical and mechanical system.

It is believed that none of the present-day ESP manufacturers filter line-to-ground (common mode). ESP manufactures typically rely on the SUT to do the common mode filtering. However, the SUT does not filter out all of the common mode current.

High frequency currents will cause skin effect heating (as this current flows on the surface of the conductors), abnormally heating conductors. The smallest and weakest links in the electrical system are most susceptible. This is typically realized in the premature failure of feed through penetrators, splices, MLE (potheads), motor winding end turns, and mechanical bearing fluting. It may also aid in the abnormal heating in the ESP seal section.

These high frequency currents can also "leak out" through the cable insulation to ground and stress cables and cable splices. The common mode high frequency currents can also couple onto the motor shaft and discharge across the motor bearings (known as rotor bearing fluting). It only takes less than 1 Amp of this high frequency current discharging across bearings to cause mechanical failure in a 12 to 18-month time frame. To extend this 12 to 18-month time frame, a Common Mode Filter according to an illustrative embodiment of the invention disclosed herein (retrofit standalone) is applied at high side the high side of the SUT, also referred to herein as the Medium Voltage (MV) side of the SUT or Medium Voltage (MV).

Typical VSD systems (FPWM) usually have an output Voltage Total Harmonic Distortion (Vthd) of 8% to 12%. Under 5% is desired, but an upper limit of 8% is suggested (however, not mandated) by IEEE Standard 519. It is the high frequency content of this harmonic distortion associated high frequency high voltage and current spikes (content) and their harmonic high frequency spectrum content that causes these types of failures (see FIG. 1).

Figure 2:
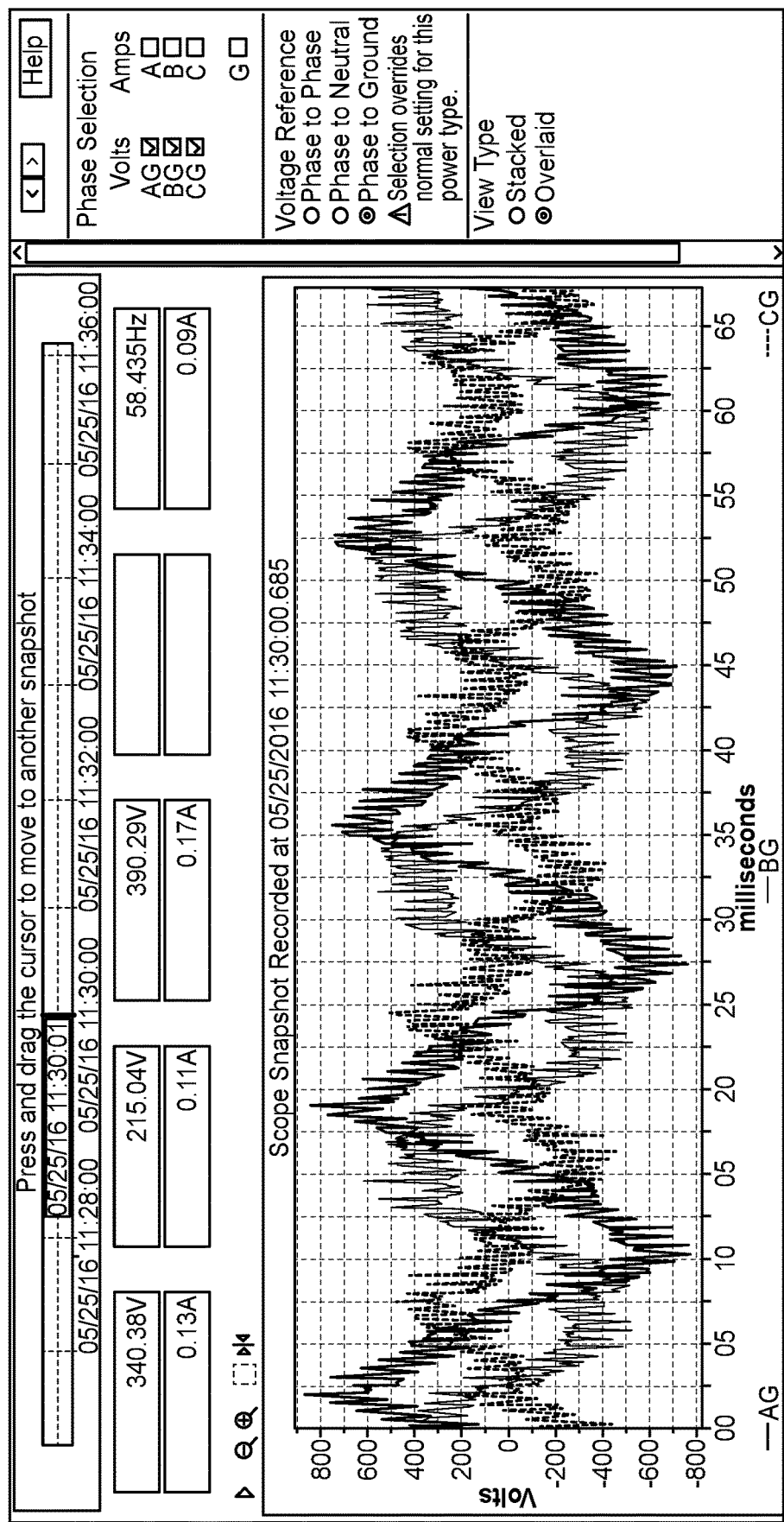
FIG. 2 is a side view of a graph depicting a frequency response for a VLG AT 480V—NO CMF.

Significant high frequency content was found line-to-ground on the 480V SWF output (see FIGS. 1 and 2). VFD manufacturers have been erroneously relying on the SUT to block all line-to-ground distortion.

Figure 3:
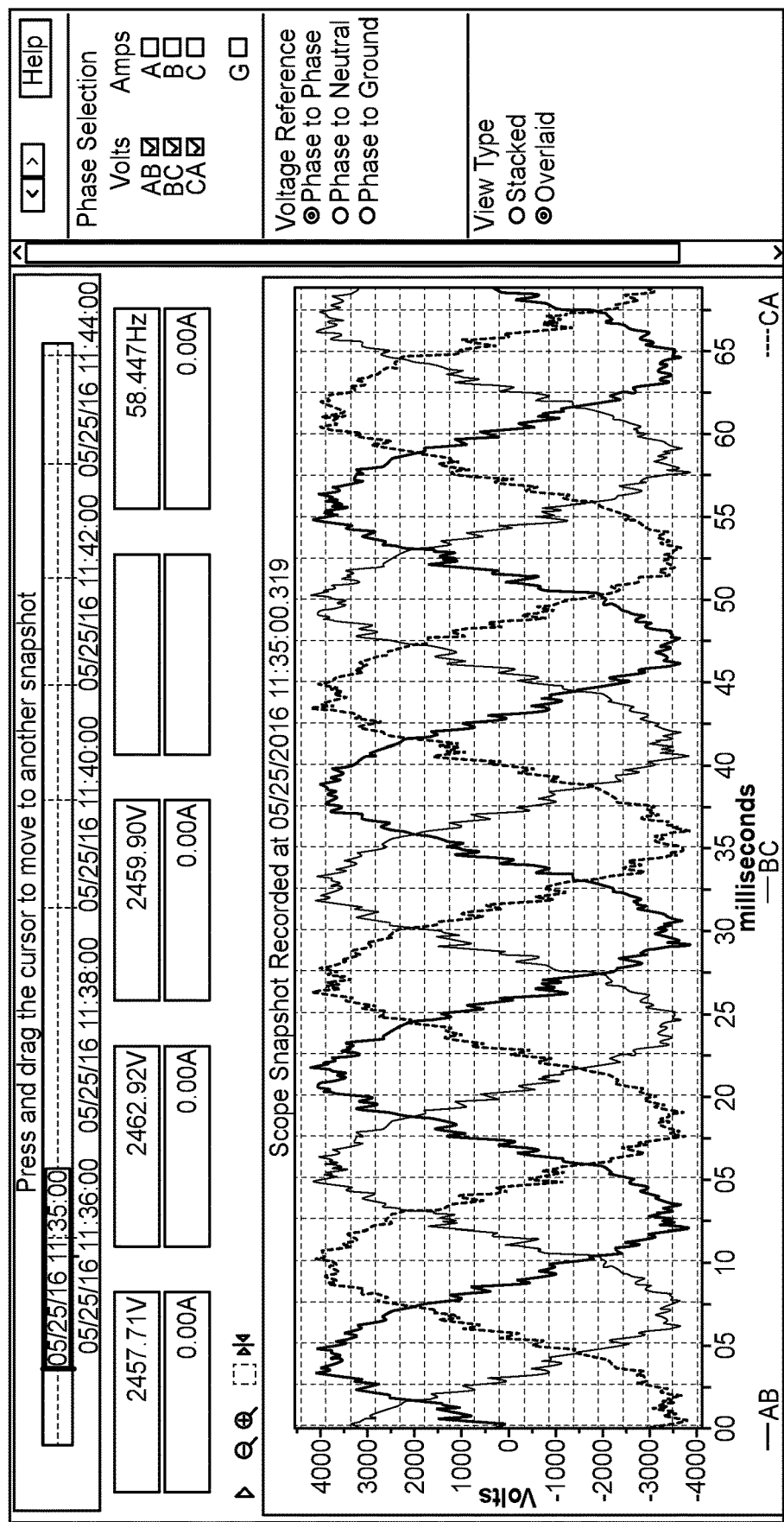
FIG. 3 is a side view of a graph depicting a frequency response for a FPWM-MV, NO CMF-VLL.

There is still significant high frequency distortion at the MV level (see FIG. 3). Note the significant high frequency content in FIG. 1 (circled data). This is the proof that the SUT is not an adequate means of eliminating or reducing the high frequency common mode content.

Figure 6:
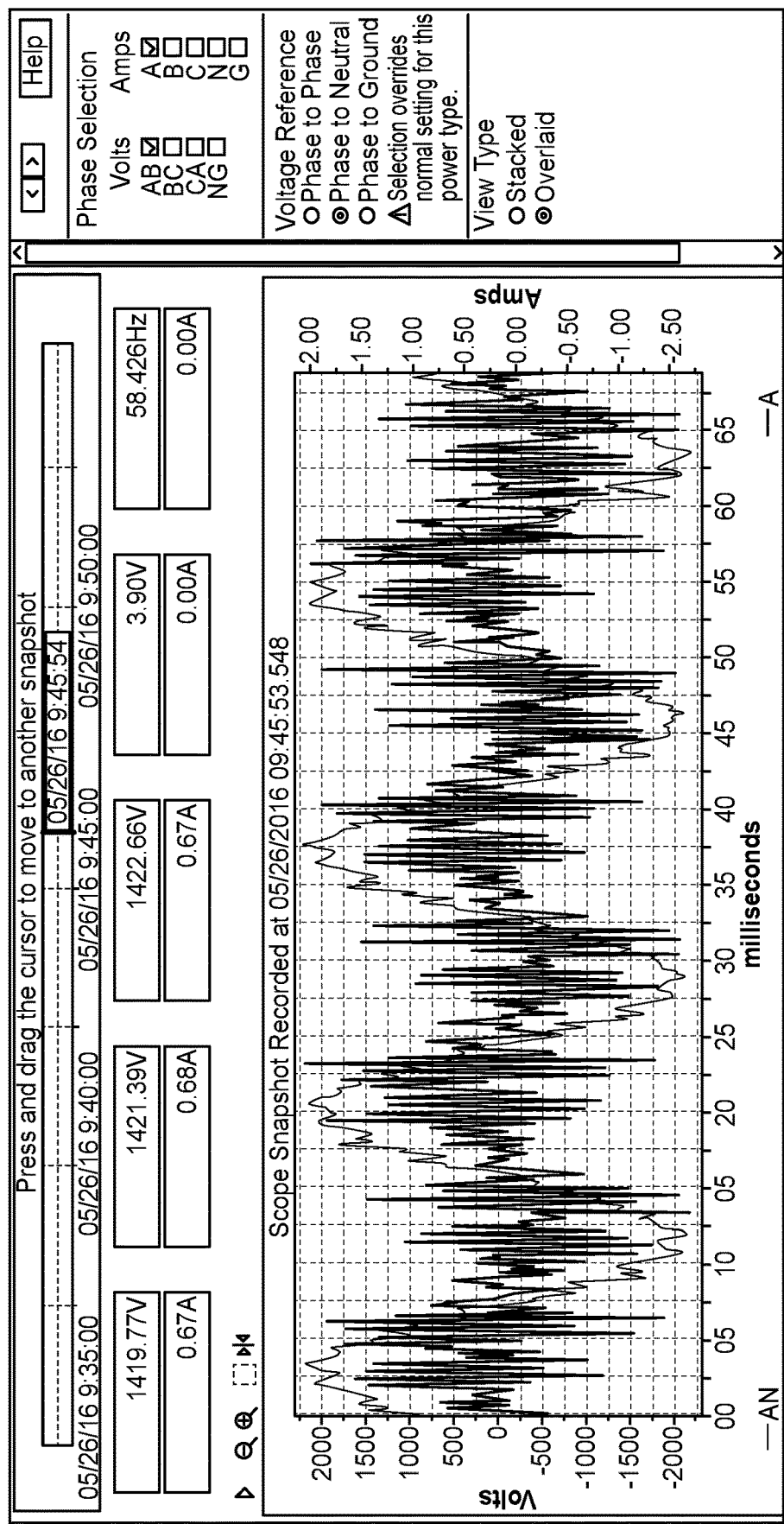
FIG. 6 is a side view of a graph depicting a frequency response for a FPWM-MV—VAG+IA INTO CMF in a particular illustrative embodiment of the invention.
Figure 7:
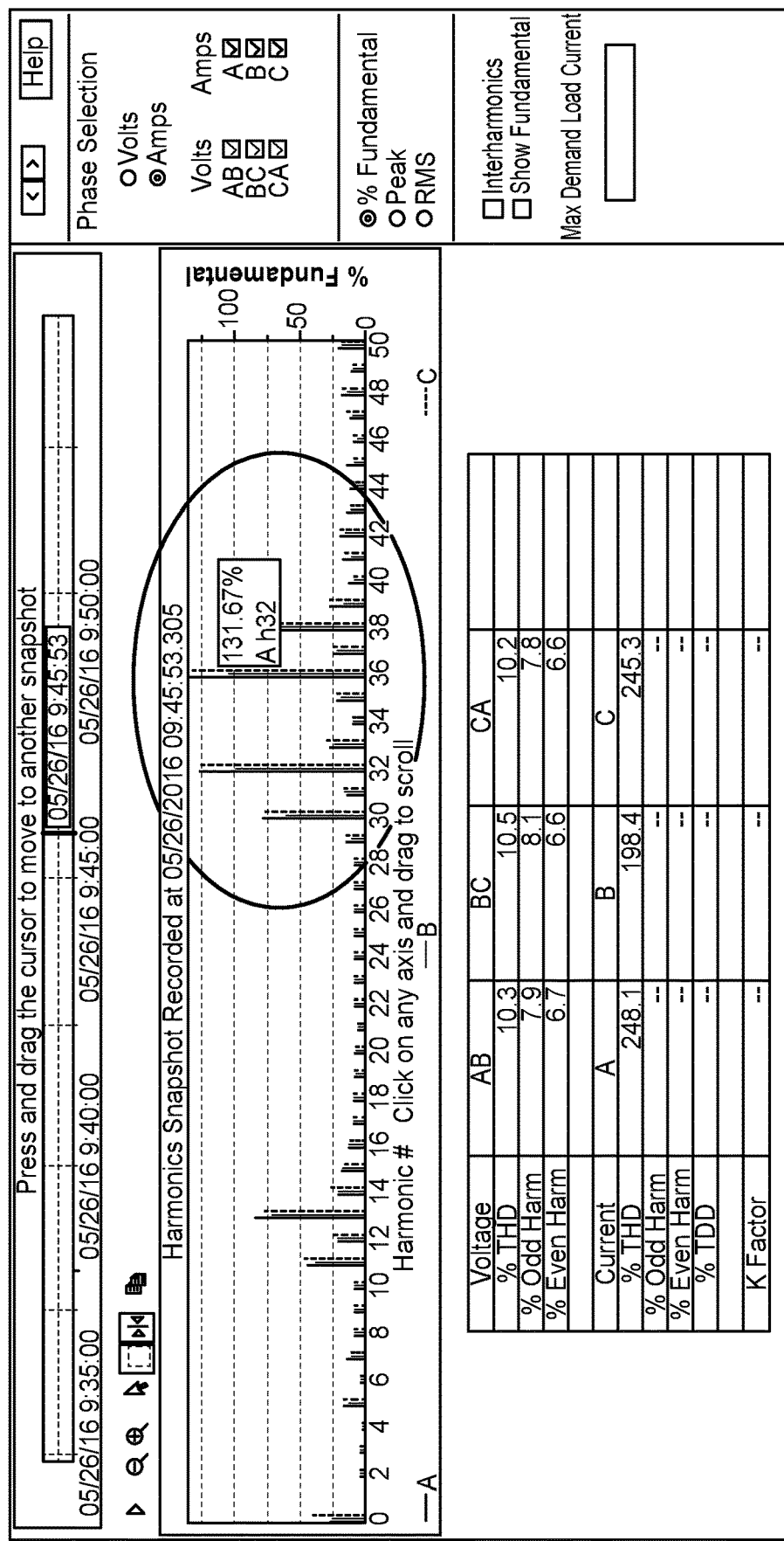
FIG. 7 is a side view of a graph depicting a frequency response for a HARMONIC CURRENT PROFILE—FPWM—CMF-MV in a particular illustrative embodiment of the invention.

A test was completed adding the Medium Voltage Common Mode Filter (CMF-MV) according an illustrative embodiment of the invention disclosed herein, by itself in FPWM mode. The MV filter absorbed 0.67 Amps of high frequency current shunted the current to ground at the surface before it can travel downhole to the ESP system. (see FIGS. 5, 6 and 7). The very high frequency components in FIG. 7 (circled data) show that the CMF-MV filter is absorbing and shunting to ground much more harmonic current than expected. The inventors have observed the CMF-MV absorbing currents as high as 3 amps. 0.67 amps was higher than expected. And of course, 3 amps was much higher than expected. The inventors expected to see 0.15 amps but observed 10-20 times the expected amount of current the CMF-MV filter was absorbing and filtering and shunting to ground.

Figure 4:
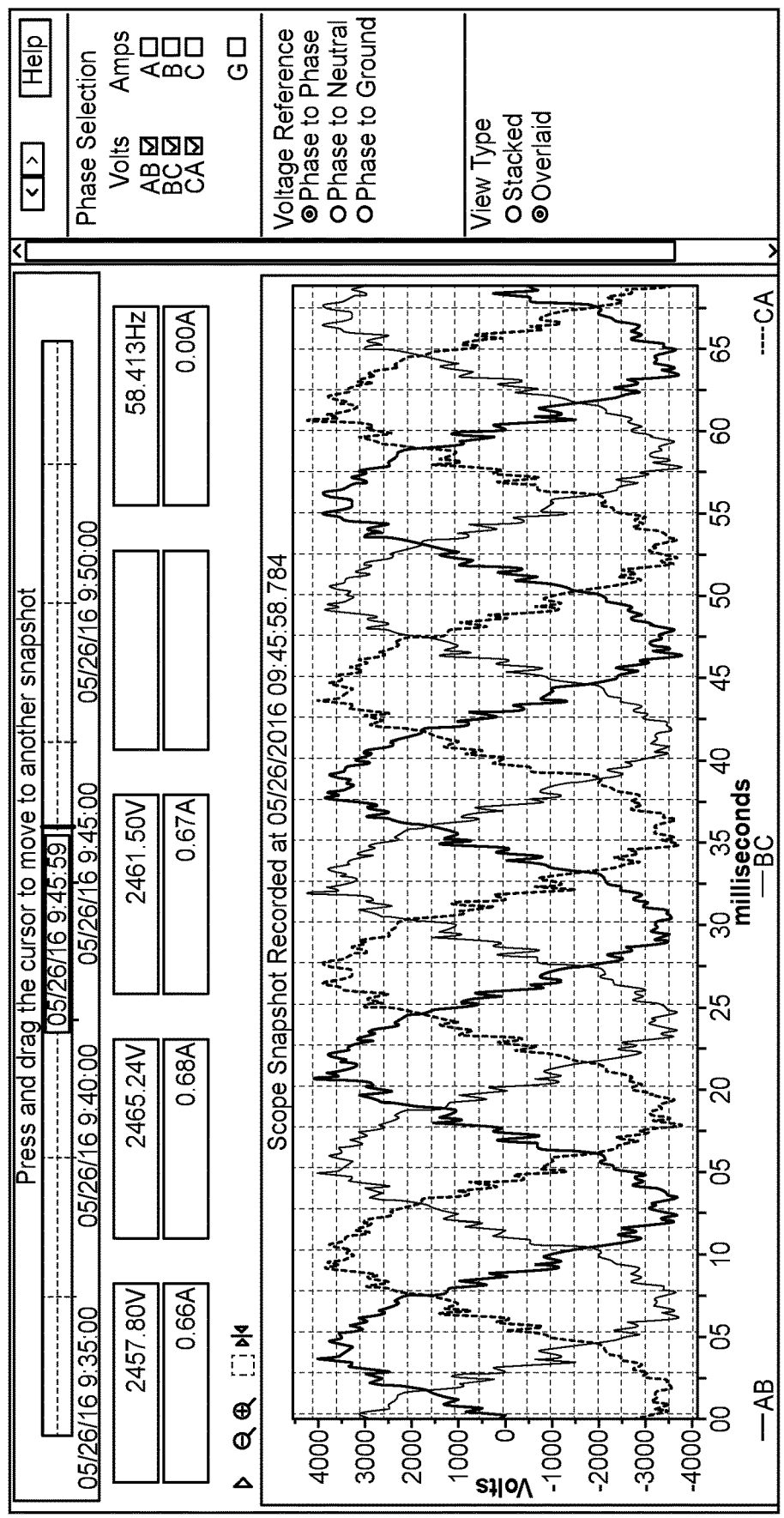
FIG. 4 is a side view of a graph depicting a frequency response for a FPW vf—CMF-MV ONLY—VLL in a particular illustrative embodiment of the invention.
Figure 5:
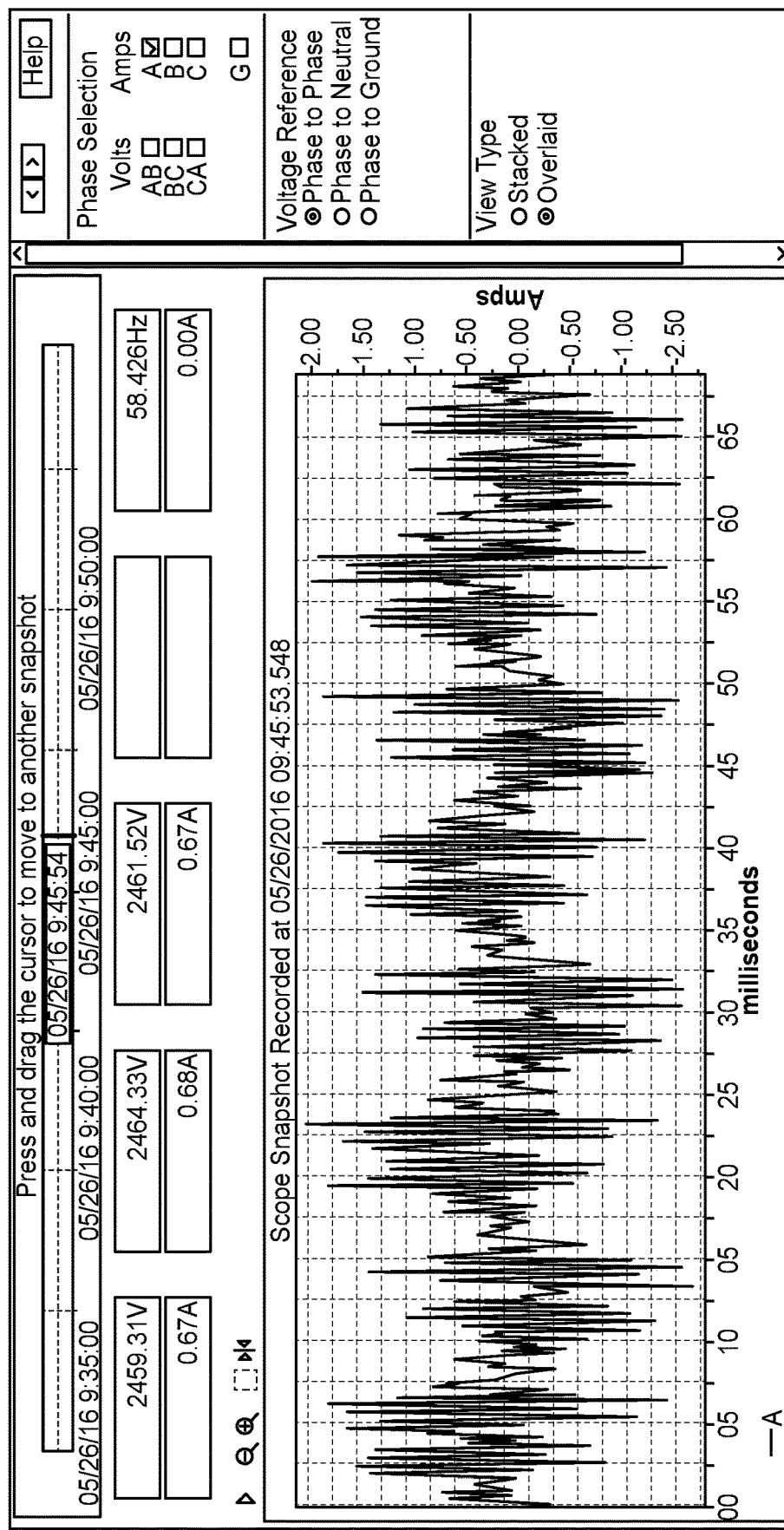
FIG. 5 is a side view of a graph depicting a frequency response for a FPWM—CMF-MV—PHASE A CURRENT THROUGH CMF TO GROUND in a particular illustrative embodiment of the invention.

If the CMF-MV was not applied, the 0.67 Amps would flow down-hole and cause stress to all ESP system components. The CMF-MV shunts this high frequency current to ground at the surface preventing it from flowing down-hole. FIG. 4 and FIG. 5 prove that the high frequency current exists. If this was not present, then there would not be any high frequency current flowing through the filter—it would only be the small fundamental (58 Hertz operating frequency of the particular well, an illustrative embodiment works at all operating frequencies) value associated with the normal sign wave.

Close examination of relevant data and all equipment will help in identifying the failure modes of the ESP system. A thorough failure analysis revealed failures in different components (i.e. cable, MLE, pump, intake, seal, motor, sensor, etc.), but in order to properly identify the root cause, a thorough analysis of the entire operating system must be conducted. As previously stated, a motor may have a shorted stator and this failure can be caused by a number of events. The events may include voltage surges from the surface, cable damage and arcing, MLE failures, poor splicing, well fluid entering from a seal failure, pothead failures and/or manufacturing defects, but may also include other deficiencies or complications that are only discovered when a thorough Root Cause Failure Analysis is performed. It must be emphasized that a quick find, such as a "motor burn" in a failure report, does not reveal the true cause of the problem.

The inventors have proven that a Medium Voltage Common Mode Filter (CMF-MV) shunts the high frequency current to ground at the surface, preventing it from flowing down-hole. In turn this will lead to increased run life of cable, penetrators, splices, MLE/potheads and motors (both electrically and mechanically).

A CMF-MV is a cost-effective addition to all FPWM VSDs applied in the ESP industry, because the drives only have SWF (L-L), but do not have the necessary benefits of CMF (L-G).

Figure 8:
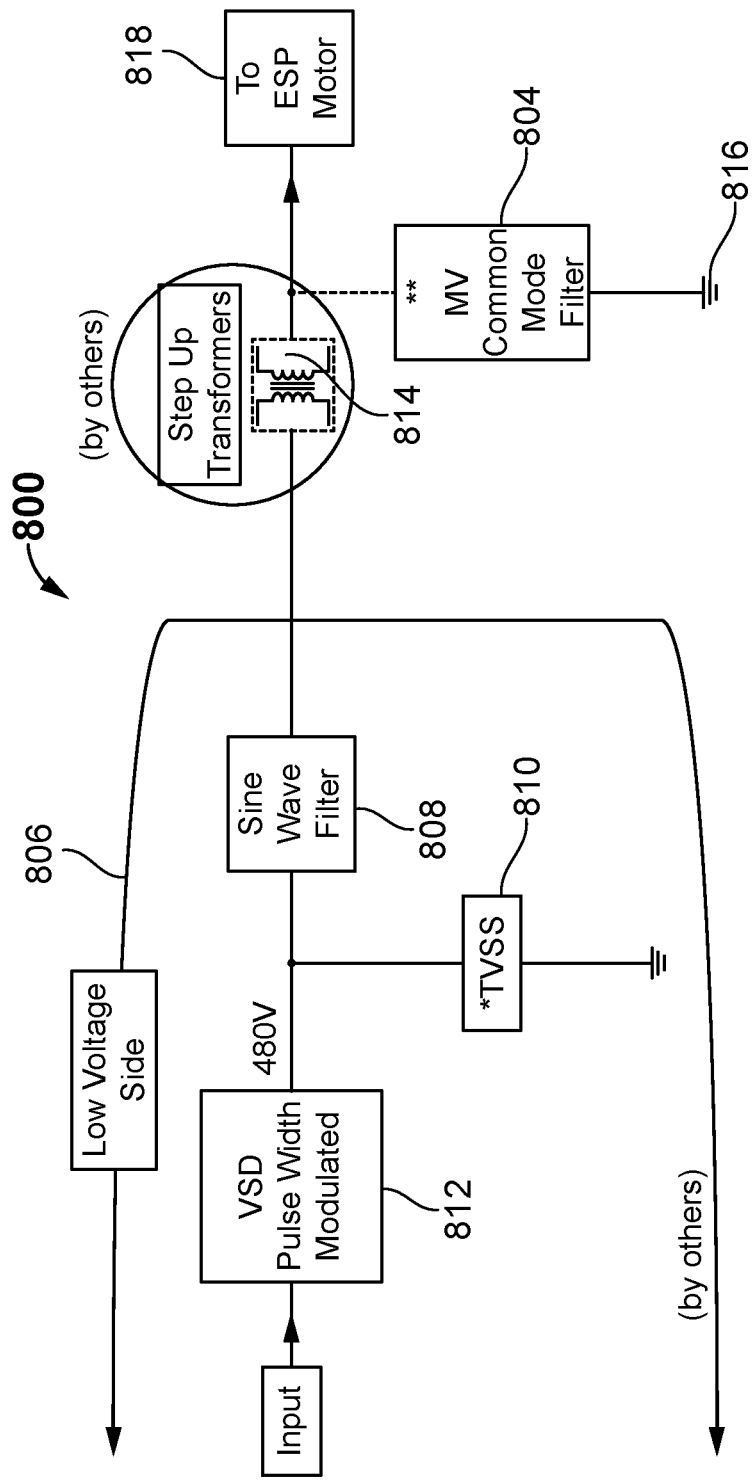
FIG. 8 is a side view of a block diagram depicting of particular illustrative embodiments of the invention.

Turning now to FIG. 8, FIG. 8 is a schematic depiction of a particular illustrative embodiment of the invention. As shown in FIG. 8, location is shown for a medium voltage common mode filter 804 shown attached to a high voltage side of a step-up transformer (SUT) 814. The medium voltage filter 804 is electrically connected to ground 816. Electrical power is supplied from a VFD output 812 to a low voltage side 806 of the SUT from the VFD. Electrical power supplied to the VFD can be provided by an electrical power company distribution system or by an electrical generator generating an alternating current voltage. Variable speed drive 812 receives the electrical power from the power supply and generates a pulse width modulated (PWM) 480-volt waveform and sends the waveform through the sine wave filter 808. The sine wave filter 808 filters the 480-volt PWM waveform and smooths the PWM voltage waveform into an alternating current sine wave form that is supplied to the SUT 814. Thus, the MV CMF 804 filters the voltage to remove high voltage high frequency voltage impulses extend the mechanical run life of the ESP 818.

Thus, a CMF-MV, according to an illustrative embodiment of the invention as disclosed herein, is a cost-effective addition to all FPWM VSDs applied in the ESP industry, because the drives only have SWF (L-L), but do not have the necessary benefits of CMF (L-G) having sufficient filtering and shunting of high voltage high frequency voltage and current spikes. Multiple Low Voltage Common Mode Filter (CMF-LV) variations were tested. The Multiple Low Voltage Common Mode Filter (CMF-LV) variations all worked well at the 480V level by filtering high frequency current, but were not adequate to affect the MV high frequency level that travels down-hole through the electrical cable. Thus, the CMF should be attached as a CMF-MV on the high side of the SUT instead of attaching a CMF-LV attached on a low side of the SUT.

Figure 9:
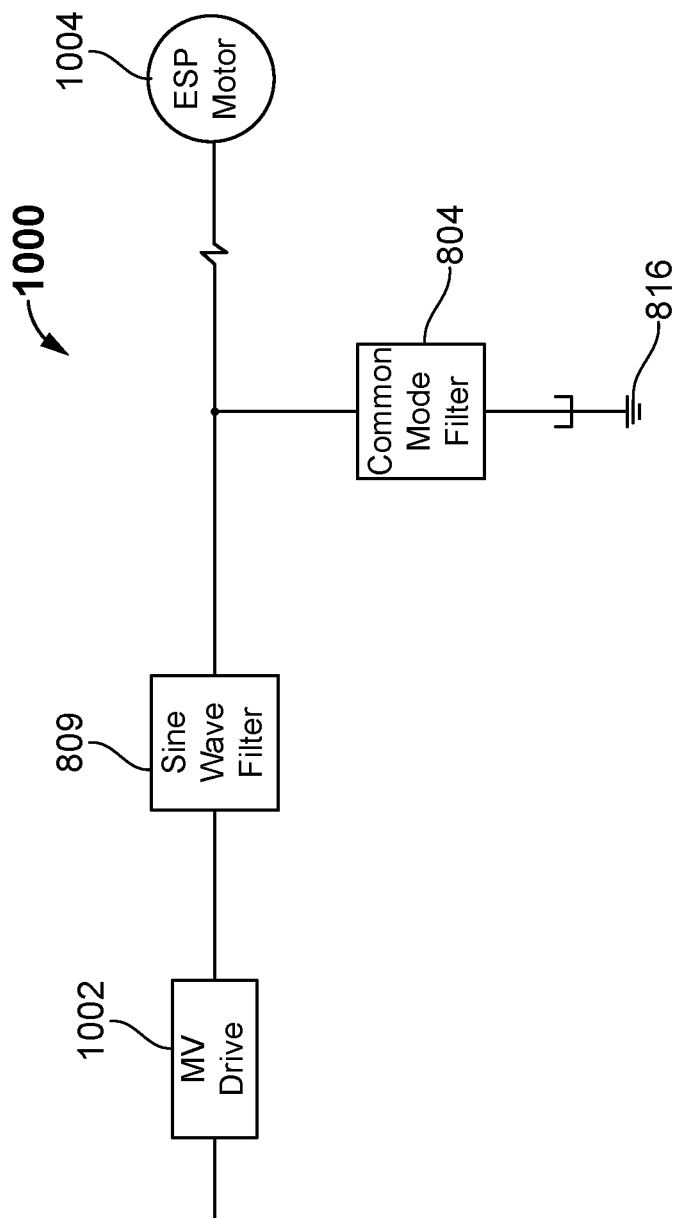
FIG. 9 is a side view of a block diagram depicting of particular illustrative embodiments of the invention.

Turning now to FIG. 9, FIG. 9 is a schematic depiction of a particular illustrative embodiment of the invention. As shown in FIG. 9, medium voltage drive 1002 supplies a voltage waveform above 600 volts to sine wave filter 809. A medium voltage common mode filter 804, connected to ground 816 is depicted filtering the sinusoidal voltage from the sine wave filter. The filtered voltage is supplied to ESP motor 1004.

Figure 10:
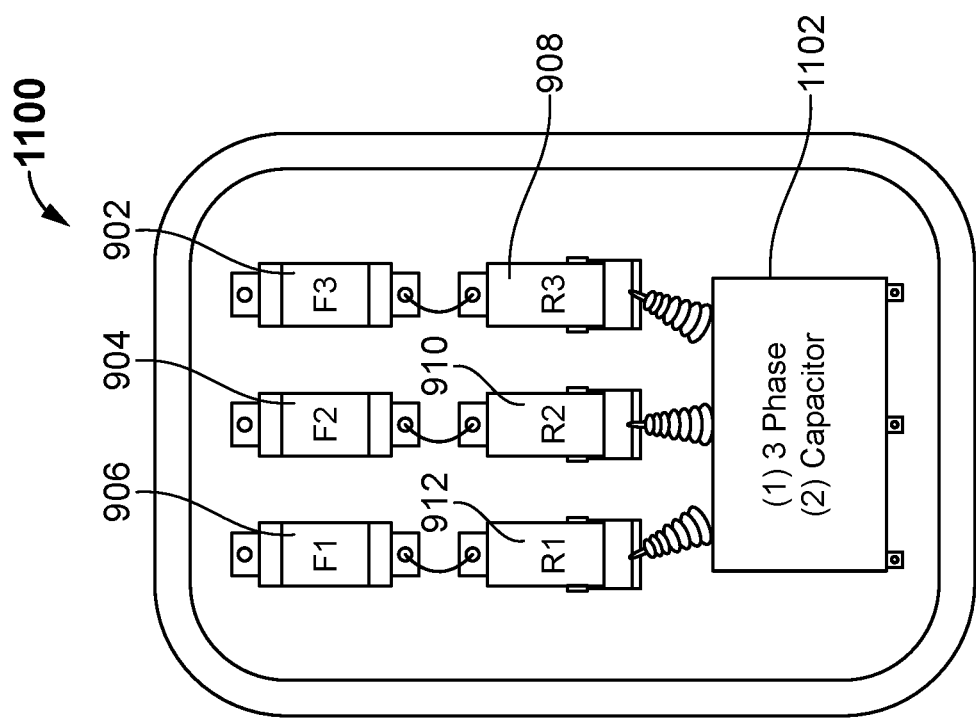
FIG. 10 is a block diagram depicting of particular illustrative embodiments of the invention.

Turning now to FIG. 10, FIG. 10 is a schematic depiction of a particular illustrative embodiment of the invention. FIG. 10 an illustrative embodiment 1100 of a physical layout for a three-phase medium voltage common mode filter is depicted. As shown in FIG. 11, the three-phase filter includes but is not limited to three legs, a left, center and right leg, one leg for each of the three phases. Each of the three legs, left, center and right, includes but is not limited to a resistor R1 912, R2 910 and R3 908 respectively, connected to a three-phase capacitor 1102. The three-phase capacitor is connected to ground from its wye point.

Figure 11B:
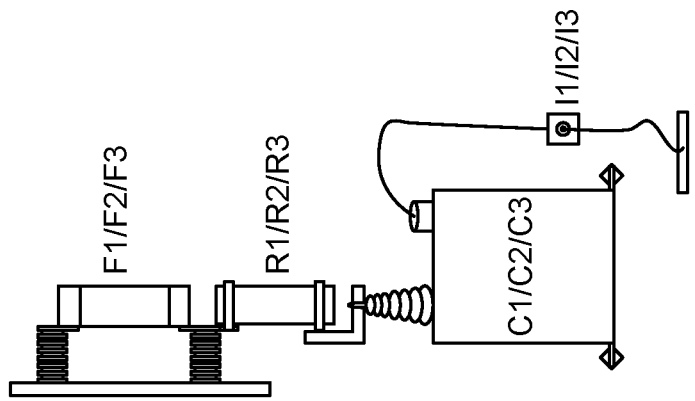
FIG. 11B is a side view of a block diagram depicting of particular illustrative embodiments of the invention.
Figure 11A:
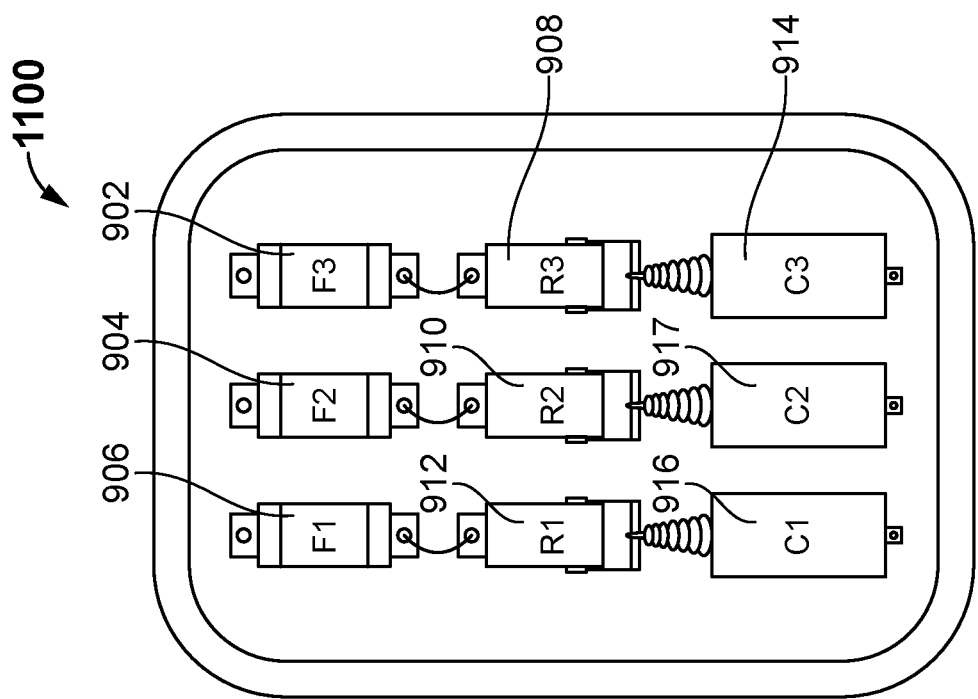
FIG. 11A is a side view of a block diagram depicting of particular illustrative embodiments of the invention.

Turning now to FIG. 11A and FIG. 11B, FIG. 11A and FIG. 11B are a schematic depictions of medium voltage common mode filter (MV CMF) layout using 3 single phase capacitors in a particular illustrative embodiment of the invention. FIG. 11A is a front view of the illustrative embodiment depicting the physical layout for common mode filter components R1, C1, F1, R2, C2, F2, R3, C3 and F3. FIG. 11B depicts a left-hand view of the embodiment depicted in FIG. 11A.

Figure 12:
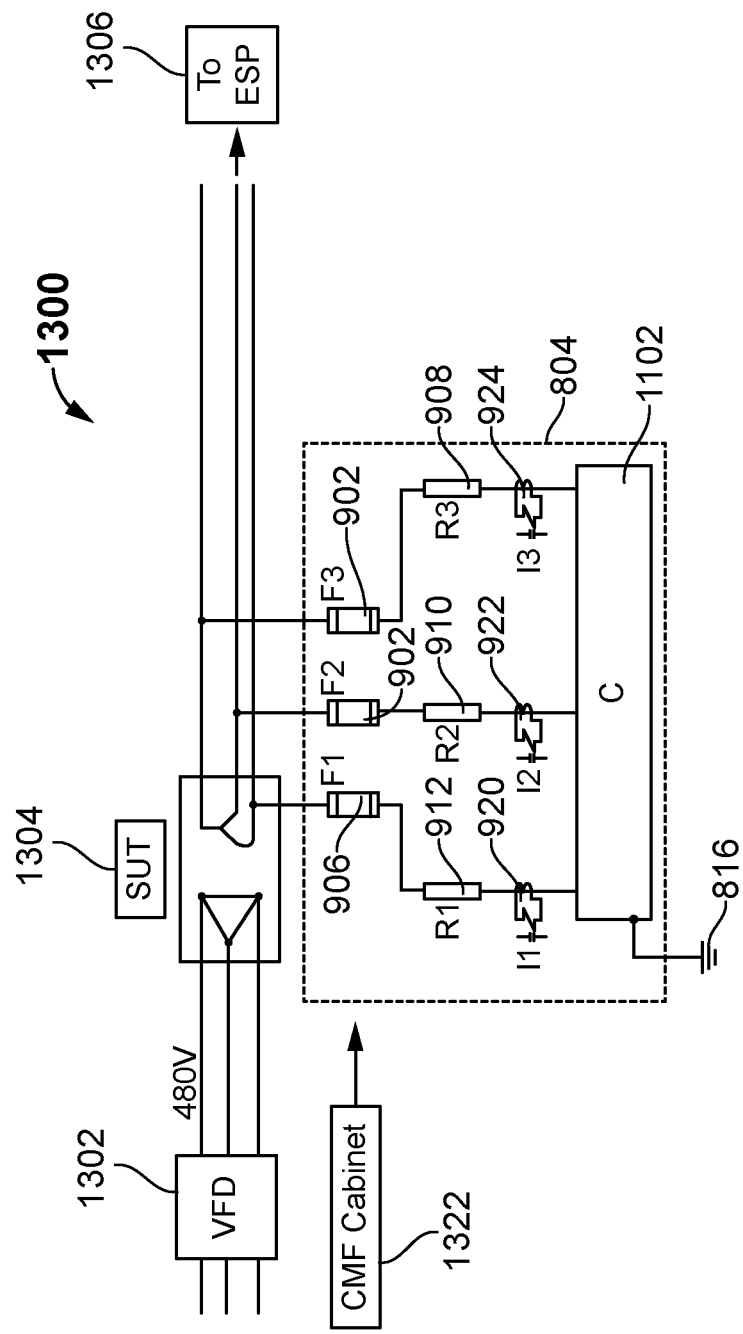
FIG. 12 is a side view of a block diagram depicting of particular illustrative embodiments of the invention.

Turning now to FIG. 12, FIG. 12 is a schematic depiction of a particular illustrative embodiment 1300 of the invention. As shown in FIG. 12 a variable frequency drive (VFD) 1302 supplies a 480-volt, voltage waveform to step-up transformer 1304. A MV CMF 804 is electrically connected to the high voltage taps of the step-up transformer. The voltage from the SUT, filtered by the MV CMF is supplied to an ESP 1306 system.

Figure 13:
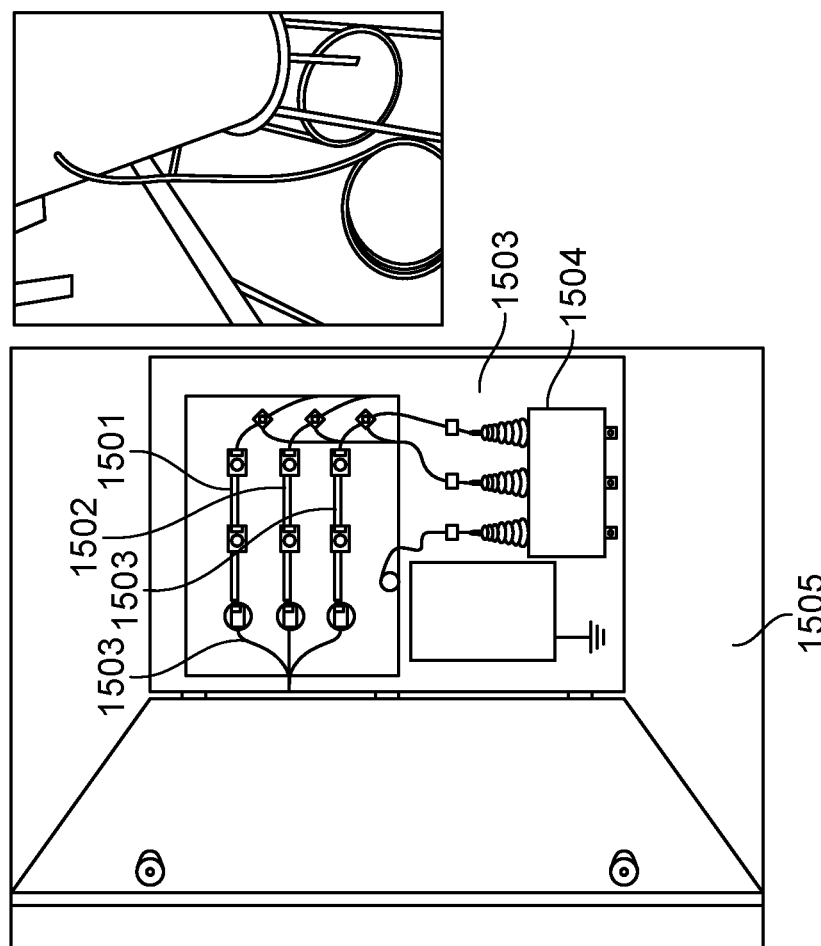
FIG. 13 is a side view of a block diagram depicting of particular illustrative embodiments of the invention.
Figure 14:
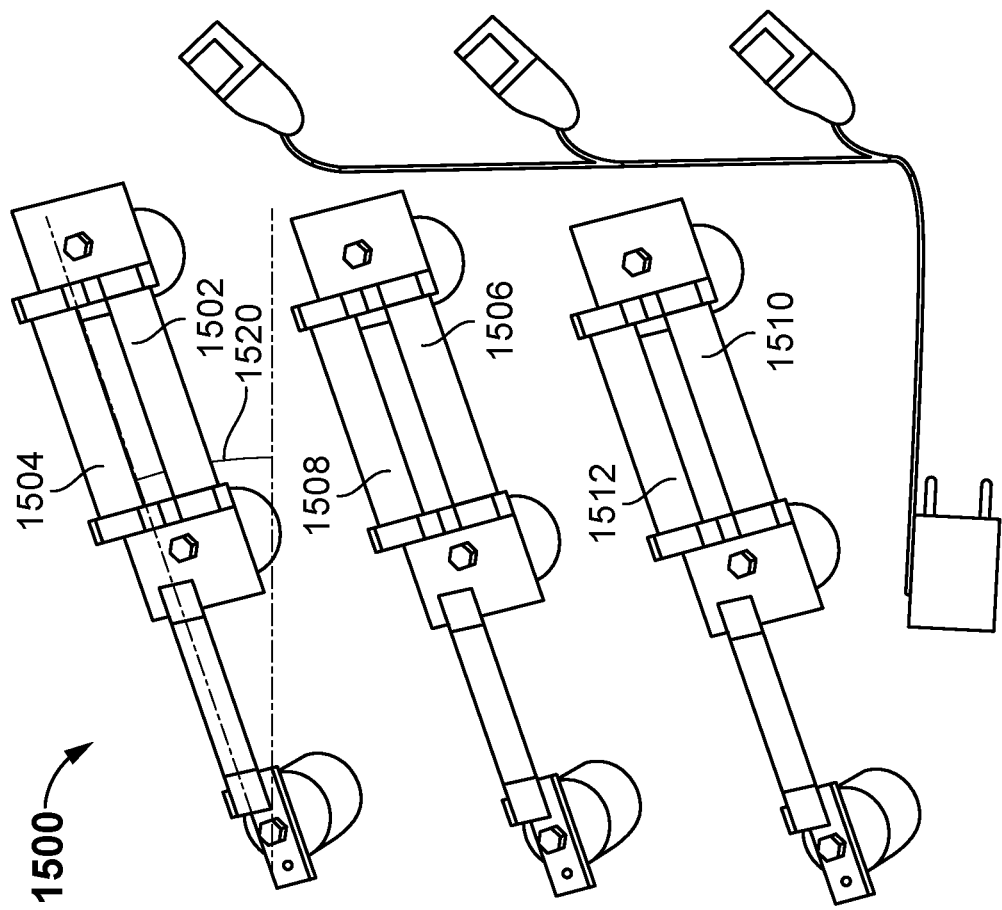
FIG. 14 is a side view of a block diagram depicting of particular illustrative embodiments of the invention.

Turning now to FIG. 13 and FIG. 14, FIG. 14 and FIG. 14 are schematic depictions of a particular illustrative embodiment of the invention. FIG. 13 depicts a physical layout of a MV common mode filter inside of an enclosure 1505. In the embodiment of FIG. 13, three ceramic cylindrical resistors 1501, 1502 and 1503, which are each 35 to 45 ohms, are electrically connected to a capacitor 1504. Turning now to FIG. 14, 35 to 45-ohm resistors 1501, 1502 and 1503, are each replaced with a pair of two 80-ohm resistors connected in parallel to provide a 40-ohm resistance value, using two parallel 80-ohm resistors, 1502 and 1504, 1506 and 1508, and 1510 and 1512, respectively. All of the resistors in FIGS. 13 and 14 are cylindrical ceramic resistors made as a hollow ceramic tube with a conductive resistive coating on the outside of the tube, which allows air to pass through a hollow center of each of the ceramic cylindrical resistors. The parallel resistor configuration depicted in FIG. 14 provides for better heat dissipation as opposed to the single 35 to 45-ohm resistors configuration of FIG. 13. Also, as shown in FIG. 13, the resistors 1502 and 1504, 1506 and 1508, and 1510 and 1512, are placed at a 20-degree angle 1520 of horizontal where the enclosure is installed with so that rising heated air inside of the enclosure enters the lower end of each of the resistors and flows through the lower end of the resistor and rises toward the higher end of the resistor. The 20-degree angle facilitates rising air flow through the ceramic cylindrical resistors 1502 and 1504, 1506 and 1508, and 1510 and 1512, and facilitates heat dissipation in the ceramic cylindrical resistors 1502 and 1504, 1506 and 1508, and 1510 and 1512. The 20-degree angle used for mounting the ceramic cylindrical resistors 1502 and 1504, 1506 and 1508, and 1510 and 1512 also requires less horizontal distance for the layout of the ceramic cylindrical resistors 1502 and 1504, 1506 and 1508, and 1510 and 1512 inside the enclosure so that a smaller size enclosure is required to house the Electrical wires 1503 connected to the ceramic cylindrical resistors 1502 and 1504, 1506 and 1508, and 1510 and 1512 laid out in the enclosure at a 20-degree angle off horizontal.

Figure 15:
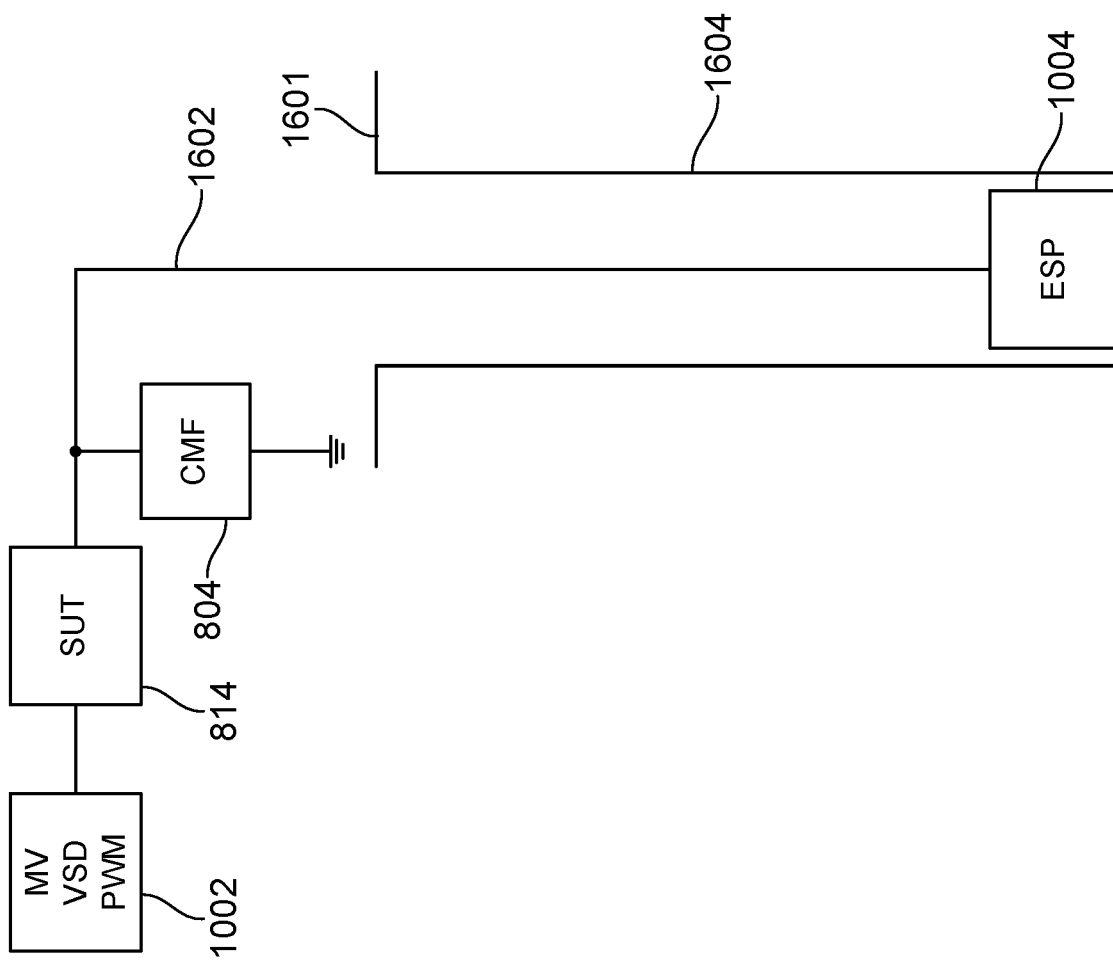
FIG. 15 is a side view of a block diagram depicting of particular illustrative embodiments of the invention.

Turning now to FIG. 15, a block diagram of a system in an illustrative embodiment 1600 of the invention is depicted. As shown in FIG. 15, a surface-based MV VSD 1002, surface-based MV SWF 809, SUT 814 and surface-based MV common mode filter 804 are shown delivering filtered power having the high voltage high frequency substantially reduced, wherein the filtered power is provided through an electrical cable 1602 to an ESP 1004 deployed down wellbore 1604 drilled in the Earth's surface 1601.

Figure 16:
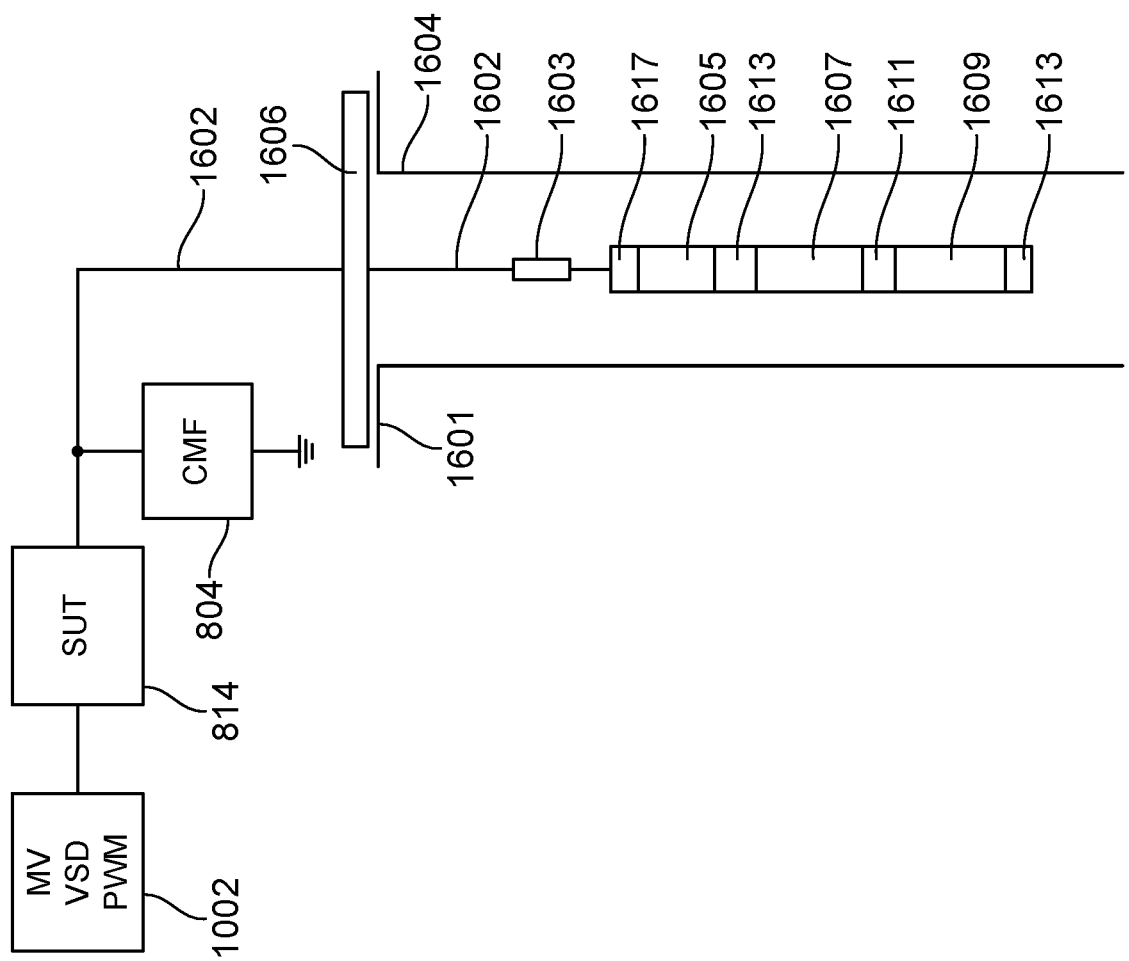
FIG. 16 is a side view of a block diagram depicting of particular illustrative embodiments of the invention.

Turning now to FIG. 16, as shown in FIG. 16 a block diagram of an ESP system is depicted of an illustrative embodiment of the invention is shown in attached to and ESP system. The ESP system includes but is not limited to a penetrator 1601, splice 1603, ESP 1617, motor extension (MLE) 1605, seal 1613, pothead 1607, motor 1609 and motor bearings 1611 and 1613. As shown in FIG. 16, surface-based MV VSD 1002, surface-based MV SWF 809, SUT and surface-based MV common mode filter 804 are shown delivering filtered power having the high voltage high frequency substantially reduced, wherein the filtered power is provided through an electrical cable 1602 to an ESP 1004 deployed down wellbore 1604 drilled in the Earth's surface 1601.

All current switches operate on current magnitude flowing through them. Any time the current is no greater than 0.25 amps, the current switches normally closed contact is open (or if a normally open contact, it is closed). If the fuse ever blows, no current will flow and the switch contact changes position sending an alarm. Depending on control choices by the end user, a normally closed contact can be supplied instead of a normally open contact. The switch should be able to sense as low as 0.25 amps and still function up to 200 amps. The current switch should operate reliably with high frequency current content superimposed onto the fundamental current wave form. This tolerance to high frequency current content of the current switch is important to avoid nuisance operations.

MV Capacitors (can be used on MV side of step-up transformers—or a MV drive that does not have a step-up transformer). Voltage ratings need to be at least 4800V. MFD values are much wider—primarily due to VSD kVA size. Range is 0.25 MFD to 2 MFD per phase.

These MV capacitors are manufactured to IEEE 18 standard but are custom versions that are application specific. Microfarads will range from 0.2 MFD to 2 MFD per phase. A preferred capacitor is 0.5 MFD. The capacitors are packaged into a 3-phase unit (although using 3 single phase capacitors will work except they will require a bigger cabinet and are more costly). Voltage ratings are 4800V line to line and 4800 V line to ground.

The MV fuses are general purpose fuses. The MV fuses are current limiting (to provide very low arc flash levels for personnel safety and not nuisance blow due to the high frequency harmonics) and rated for at least 5 kV.

The resistors are non-inductive ceramic tube resistors with a hollow core for air movement through the tube. The hollow ceramic tube resistors are also referred to herein and above as ceramic cylindrical resistors. The center passage formed by the hollow tube allows for better thermal cooling characteristics in the resistors. In a particular embodiment, the hollow core resistors are mounted at a 20-degree angle to provide a natural thermal cycling effect without fans through the rise and flow of hot air through the hollow core resistors. If the hollow core resistors are horizontal, we would not get this additional cooling. The purpose of the resistors is to limit inrush current to the capacitors when they are first energized at a very low frequency when started and to minimize voltage reflections. Drive protection features could easily operate without them, however, the absence of the resistors can cause difficulty getting the drive on line/ well up to speed. The resistors ohmic value is matched to a surge impedance of the cable, which helps cancel high frequency voltage reflections. The ohmic values range from 35 to 45 ohms but these could change for different cable sizes. The primary insulation to ground in the box are the stand-off insulators beneath them. When we need more thermal capacity, we parallel 2 resistors and double their ohmic values (nominal 80-ohm resistors in parallel yield 40 ohms in the CMF circuit but with much higher thermal capabilities). A ground wire connecting the common mode filter to ground should preferably be large and highly stranded, to provide a very low impedance to ground at high frequency.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed.

The invention claimed is:

1. A system for reducing motor bearing fluting in a down hole electric submersible pump, the apparatus comprising:
    a downhole electrical submersible pump deployed downhole in a wellbore drilled in a surface of the Earth, wherein the downhole electrical submersible pump is connected to a surface mounted line-to-ground filter by an electrical cable attached between the surface-mounted line-to-ground filter and the electrical submersible pump;
    a pulse width modulated three-phase power supply that generates a pulse width modulated three-phase low voltage waveform at a nominal range of 480-600 volts from a pulse width modulated power supply output to provide power to the downhole electric submersible pump;
    a sine wave filter electrically connected to the pulse width modulated power supply output, wherein the sine wave filter generates a three-phase sinusoidal voltage waveform at a nominal low voltage 480-600 Volts and provides the three-phase sinusoidal voltage waveform from a sine wave filter output on the sine wave filter;
    a step-up transformer having a low side, wherein the low side is electrically connected to the output of the sine waver filter and receives the three-phase sinusoidal voltage waveform, the step-up transformer further having a high side, wherein the step-up transformer transforms the three-phase sinusoidal voltage waveform 480 volts received on the low side to a higher medium voltage waveform on the high side;
    a line-to-ground filter electrically connected between an electrical ground and the three-phase medium voltage on the high side of the step-up transformer, the line-to-ground filter comprising:
    a common mode filter, the common mode filter comprising,
    a capacitor, the capacitor having a first and second end, wherein the first end of the capacitor is grounded;
    a plurality of resistors, wherein the plurality of resistors are each connected to the second end of the capacitor, wherein the plurality of resistors comprises a first, second and third resistor, wherein a first end of the first resistor is connected in series to the second end of the capacitor and connected to a first phase of the three-phase medium voltage, a second resistor connected in series to a second phase of the three-phase medium voltage wherein a first end of the second resistor is connected in series to the second end of the capacitor and a third resistor connected in series to a third phase of the three-phase medium voltage, wherein a first end of the third resistor is connected in series to the second end of the capacitor, wherein the first, second and third resistors each have a first end connected to the capacitor and a second end that receives one phase of the three-phase medium voltage waveform, wherein the three-phase medium voltage waveform contains high voltage high frequency voltage spikes, from the step-up transformer and wherein the line-to-ground filter and supplies the filtered medium voltage waveform to an electric submersible pump deployed down hole in a wellbore, wherein the filtered medium voltage waveform is provided to an extended length of an electrical cable and wherein the line-to-ground filer substantially wherein the line-to-ground filter generates a filtered medium voltage waveform to the electric submersible pump, the filtered medium voltage having substantially reduced high voltage high frequency spikes which substantially reduces bearing fluting in motor bearings in the electric submersible pump caused by the high voltage high frequency voltage spikes.

2. The system of claim 1 wherein the capacitor has a capacitance value of 0.5 micro farads.

3. The system of claim 2, wherein each of the plurality of resistors is a hollow cylindrical resistor having a hollow center along a longitudinal axis for the hollow cylindrical resistor, wherein the hollow cylindrical resistor is physically mounted so that the longitudinal axis of the hollow cylindrical resistor is set at a 20-degree angle from horizontal which facilitates hot air rising through the hollow center of the cylindrical resistor from a low end of the hollow cylindrical resistor to a high end of the hollow cylindrical resistor.

4. The system of claim 1 wherein the capacitor has a capacitance value within a range of 0.25 micro farads to 3 micro farads.

5. The system of claim 1 wherein the capacitor is a three-phase capacitor.

6. The system of claim 1, wherein the resistor has a value within a range of 35 to 45 ohms.

7. The system of claim 1, wherein the medium voltage is a nominal range of 1,000 to 4,500 volts.

8. A method for reducing electrically induced mechanical failures in a down hole electric submersible pump system caused by high voltage high frequency spikes, the method comprising:
connecting a downhole electrical submersible pump deployed downhole in a wellbore drilled in a surface of the Earth to a surface mounted line-to-ground filter by an electrical cable attached between the surface-mounted line-to-ground filter and the electrical submersible pump;
generating a pulse width modulated low voltage waveform at a nominal 480 volts from a pulse width modulated power supply output to provide power to the downhole electric submersible pump;
generating sinusoidal voltage waveform from the low voltage waveform at a nominal low voltage 480 Volts from a sine waver filter output;
transforming the low voltage 480 volts using a step-up transformer to a medium voltage on a high side of the step-up transformer;
generating a filtered medium voltage waveform from the step-up transformer and wherein the line-to-ground filter supplies the filtered medium voltage waveform to an electric submersible pump over an extended length of an electrical cable and wherein the line-to-ground filer substantially reduces bearing fluting in bearings in the electric submersible pump a line-to-ground filter electrically connected between an electrical ground and the medium voltage high side of the step-up transformer, the line-to-ground filter comprising a capacitor having a first end connected to a ground and a second end that receives medium voltage waveform and a resistor connected in series between the first sinusoidal voltage waveform and the first end of the capacitor, wherein the medium voltage waveform contains high voltage high frequency spikes and related high frequency currents.

9. The method of claim 8 wherein the capacitor has a capacitance value of 0.5 micro farads.

10. The method of claim 9, the method further comprising:
mounting the resistors so that the longitudinal axis of the hollow cylindrical resistor is set at a 20-degree angle from horizontal facilitating hot air rising through a hollow center of the cylindrical resistor from a low end of the hollow cylindrical resistor to a high end of the hollow cylindrical resistor wherein the resistor is a hollow cylindrical resistor having a hollow center along a longitudinal axis for the hollow cylindrical resistor.

11. The method of claim 8 wherein the capacitor has a capacitance value within a range of 0.25 micro farads to 3 micro farads.

12. The method of claim 8, wherein the resistor has a value within a range of 35 to 45 ohms.

13. The method of claim 8, wherein the medium voltage is a nominal range of 1,000 to 4,500 volts.

* * * * *